US012763371B2

(12) United States Patent
Cheng et al.

(10) Patent No.: US 12,763,371 B2
(45) Date of Patent: Oct. 13, 2026

(54) PREPARATION METHOD FOR LITHIUM BIS(FLUOROSULFONYL)IMIDE INCLUDING MULTIPLE AMMONIA SOURCE ADDITIONS, ELECTROLYTIC SOLUTION AND SECONDARY BATTERY

(71) Applicants: CONTEMPORARY AMPEREX TECHNOLOGY CO., LIMITED, Ningde (CN); CATL-SICONG NOVEL MATERIALS CO., LTD, Longyan City (CN)

(72) Inventors: Sicong Cheng, Longyan City (CN); Qisen Huang, Ningde (CN)

(73) Assignees: CONTEMPORARY AMPEREX TECHNOLOGY CO., LIMITED, Ningde (CN); CATL-SICONG NOVEL MATERIALS CO., LTD, Longyan City (CN)

( * ) Notice: Subject to any disclaimer, the term of this patent is extended or adjusted under 35 U.S.C. 154(b) by 600 days.

(21) Appl. No.: 18/366,251

(22) Filed: Aug. 7, 2023

(65) Prior Publication Data

US 2023/0378542 A1 Nov. 23, 2023

Related U.S. Application Data

(63) Continuation of application No. PCT/CN2022/074933, filed on Jan. 29, 2022.

(51) Int. Cl.
*H01M 10/0568* (2010.01)
*C01B 21/086* (2006.01)

(52) U.S. Cl.
CPC ....... *H01M 10/0568* (2013.01); *C01B 21/086* (2013.01); *C01P 2006/40* (2013.01); *H01M 2300/0025* (2013.01)

(58) Field of Classification Search
CPC ......................... H01M 10/0568; C01B 21/086
USPC ....................... 429/321, 322, 323; 423/179.5
See application file for complete search history.

(56) References Cited

U.S. PATENT DOCUMENTS

| | | | | |
|---|---|---|---|---|
| 2012/0020867 | A1* | 1/2012 | Morinaka | C07F 9/26 423/386 |
| 2012/0041233 | A1* | 2/2012 | Sato | C01B 21/0935 564/154 |

FOREIGN PATENT DOCUMENTS

| | | | | | |
|---|---|---|---|---|---|
| CN | 107188138 | A | | 9/2017 | |
| CN | 108373142 | A | | 8/2018 | |
| CN | 109119685 | A | | 1/2019 | |
| CN | 109734061 | A | | 5/2019 | |
| CN | 109923063 | A | | 6/2019 | |
| CN | 110217764 | A | * | 9/2019 | C07C 209/00 |
| CN | 111320151 | A | | 6/2020 | |
| CN | 111483986 | A | | 8/2020 | |
| CN | 111517293 | A | * | 8/2020 | C01B 21/093 |
| CN | 113247871 | A | | 8/2020 | |
| CN | 111620315 | A | | 9/2020 | |
| CN | 112919435 | A | | 6/2021 | |
| WO | 2016093400 | A1 | | 6/2016 | |

OTHER PUBLICATIONS

Extended European Search Report for Application No. 22922539.6, mailed on Sep. 2, 2024, 9 pages.
ISR for International Application PCT/CN2022/074933 mailed Oct. 25, 2022.
Written Opinion for International Application PCT/CN2022/074933 mailed Oct. 25, 2022.
First Chinese Office Action for copending application CN-202210111168.4 dated Sep. 13, 2022.

* cited by examiner

*Primary Examiner* — Sean P Cullen
(74) *Attorney, Agent, or Firm* — Ladas & Parry LLP

(57) ABSTRACT

A method for preparing lithium bis(fluorosulfonyl)imide, including (1) adding an organic solvent and an absorbent A to a reaction kettle, then adding part of an ammonia source, and finally adding $SO_2X_2$ and a remaining ammonia source simultaneously for reaction, to obtain a solution of a salt ($SO_2F$—NH—$SO_2F$)·A containing bis(fluorosulfonyl)imide and the absorbent A, where in the $SO_2X_2$, X is independently fluorine or chlorine; (2) performing filtration, concentration and washing on the solution obtained in step (1) to obtain a purified salt ($SO_2F$—NH—$SO_2F$)·A of the bis(fluorosulfonyl)imide and the absorbent A; (3) adding a lithium source to the purified salt ($SO_2F$—NH—$SO_2F$)·A of the bis(fluorosulfonyl)imide and the absorbent A obtained in step (2) for reaction to obtain a solution containing lithium bis(fluorosulfonyl)imide; and (4) performing dehydration, concentration, crystallization with a non-aqueous poor solvent, and drying on the solution obtained in step (3) to obtain the lithium bis(fluorosulfonyl)imide is described.

12 Claims, No Drawings

PREPARATION METHOD FOR LITHIUM BIS(FLUOROSULFONYL)IMIDE INCLUDING MULTIPLE AMMONIA SOURCE ADDITIONS, ELECTROLYTIC SOLUTION AND SECONDARY BATTERY

CROSS-REFERENCE TO RELATED APPLICATIONS

The present application is a continuation of International application PCT/CN2022/074933 filed on Jan. 29, 2022, the subject matter of which is incorporated by reference herein.

TECHNICAL FIELD

The present application relates to the technical field of lithium ion batteries, in particular to a method for preparing lithium bis(fluorosulfonyl)imide, and lithium bis(fluorosulfonyl)imide prepared by the method, an electrolytic solution containing the lithium bis(fluorosulfonyl)imide prepared by the method and a secondary battery.

BACKGROUND

In recent years, as the application range of lithium-ion batteries is becoming more and more extensive, the lithium-ion batteries are widely applied to a variety of fields including energy storage power systems such as hydraulic power, thermal power, wind power and solar power stations, as well as electric tools, electric bicycles, electric motorcycles, electric vehicles, military equipment and aviation and aerospace. Due to the great development of the lithium-ion batteries, higher requirements are put forward for their energy density, cycle performance, safety performance and the like. Lithium bis(fluorosulfonyl)imide is expected to be a new electrolyte salt for lithium-ion batteries due to its high electrical conductivity, high thermal stability, wide electrochemical window, and low corrosion rate. However, existing methods for preparing lithium bis(fluorosulfonyl)imide still need to be improved.

SUMMARY

The present application is made in view of the above problems, and an object thereof is to provide a method for preparing lithium bis(fluorosulfonyl)imide with advantages of simple operation, mild reaction conditions, easy removal of impurity ions, and high yield, so that the prepared lithium bis(fluorosulfonyl)imide has high purity and low chroma.

In order to achieve the above object, the present application provides a method for preparing lithium bis(fluorosulfonyl)imide, and lithium bis(fluorosulfonyl)imide prepared by the method, an electrolytic solution containing the lithium bis(fluorosulfonyl)imide prepared by the method and a secondary battery.

A first aspect of the present application provides a method for preparing lithium bis(fluorosulfonyl)imide, including (1) adding an organic solvent and an absorbent A to a reaction kettle, then adding part of an ammonia source, and finally adding $SO_2X_2$ and a remaining ammonia source simultaneously for reaction, to obtain a solution of a salt ($SO_2F$—NH—$SO_2F$)·A containing bis(fluorosulfonyl)imide and the absorbent A, where in the $SO_2X_2$, X is independently fluorine or chlorine;

(2) performing filtration, concentration and washing on the solution obtained in step (1) to obtain a purified salt ($SO_2F$—NH—$SO_2F$)·A of the bis(fluorosulfonyl)imide and the absorbent A;

(3) adding a lithium source to the purified salt ($SO_2F$—NH—$SO_2F$)·A of the bis(fluorosulfonyl)imide and the absorbent A obtained in step (2) for reaction to obtain a solution containing lithium bis(fluorosulfonyl)imide; and (4) performing dehydration, concentration, crystallization with a non-aqueous poor solvent, and drying on the solution obtained in step (3) to obtain the lithium bis(fluorosulfonyl)imide.

In the present application, when a salt ($SO_2F$—NH—$SO_2F$)·A of bis(fluorosulfonyl)imide and an absorbent A is prepared, part of an ammonia source is first added, and then $SO_2X_2$ and a remaining ammonia source are added simultaneously for reaction, which realizes the preparation of lithium bis(fluorosulfonyl)imide with high yield, and enables the prepared lithium bis(fluorosulfonyl)imide to have high purity and low chroma.

In any embodiment, in step (1), a mass of the part of the ammonia source accounts for 3%-10% of a total mass of the ammonia source. When a ratio of the mass of the part of the ammonia source to the total mass of the ammonia source is within the given range, yield of lithium bis(fluorosulfonyl) imide can be further increased, purity can be improved, and chroma can be reduced.

In any embodiment, in step (1), a molar ratio of the $SO_2X_2$ to the ammonia source is (greater than 2 to less than or equal to 3):1, optionally (2.01-2.1):1. When the molar ratio of the $SO_2X_2$ to the ammonia source is within the given range, the yield of lithium bis(fluorosulfonyl)imide can be further increased.

In any embodiment, in step (1), a molar ratio of the absorbent A to the ammonia source is (1-5):1.

In any embodiment, in step (1), temperature of the reaction is −10° C. to 50° C., optionally 5° C. to 35° C.; and time of the reaction is 2 h to 8 h. When the temperature and time of the reaction in step (1) are controlled within the given range, the yield of lithium bis(fluorosulfonyl)imide can be further increased.

In any embodiment, in step (1), the ammonia source is one or more of ammonia gas, fluorinated amine, sulfonamide, sulfamic acid and difluorinated amine.

In any embodiment, in step (1), the absorbent A is one or more of pyridine, picoline, N-methylpyrrolidone, imidazole, trimethylamine, triethylamine, tri-n-propylamine, tri-n-butylamine and diisopropylethylamine.

In any embodiment, in step (1), the organic solvent is one or more of acetonitrile, propionitrile, isopropionitrile, diethyl ether, propyl ether, isopropyl ether, tetrahydrofuran, acetone, butanone, methyl isobutyl ketone and methyl pyrrolidone.

In any embodiment, in step (3), the lithium source is one or more of lithium hydroxide, lithium carbonate, lithium nitride, lithium oxide and lithium hydride.

In any embodiment, in step (3), temperature of the reaction is 15° C. to 40° C.; and time of the reaction is 0.5 h to 6 h.

In any embodiment, in step (2) and step (4), the concentration includes reduced-pressure distillation, falling film evaporation or scraper evaporation.

In any embodiment, in step (4), the poor solvent is one or more of $C_1$-$C_8$ alkanes, benzene, toluene, xylene, dichloromethane, dichloroethane, trichloroethane, tetrachloroethane and carbon tetrachloride.

A second aspect of the present application provides lithium bis(fluorosulfonyl)imide prepared by the method according to the first aspect of the present application.

A third aspect of the present application provides an electrolytic solution containing lithium bis(fluorosulfonyl) imide, where the lithium bis(fluorosulfonyl)imide is the lithium bis(fluorosulfonyl)imide according to the second aspect of the present application or the lithium bis(fluorosulfonyl)imide prepared by the method according to the first aspect of the present application.

A fourth aspect of the present application provides a secondary battery including the electrolytic solution according to the third aspect of the present application.

In the present application, the above method for preparing lithium bis(fluorosulfonyl)imide has advantages of simple operation, mild reaction conditions, easy removal of impurity ions, and high yield. The lithium bis(fluorosulfonyl) imide prepared by the above method has high purity and low chroma, and has better performance in an electrolytic solution in the later stage.

DETAILED DESCRIPTION

Hereinafter, embodiments specifically disclosing a method for preparing lithium bis(fluorosulfonyl)imide of the present application will be described in detail with reference to drawings as appropriate. However, unnecessarily detailed descriptions may be omitted in some cases. For example, detailed description for a well-known matter and repeated description for a practically identical structure are omitted. This is done to avoid unnecessarily redundant descriptions for ease of understanding by persons skilled in the art.

In addition, the drawings and the following description are provided for persons skilled in the art to fully appreciate the present application, and are not intended to limit the subject matters described in the claims.

A "range" disclosed herein is defined in the form of a lower limit and an upper limit. A given range is defined by selecting a lower limit and an upper limit, and the selected lower limit and upper limit define boundaries of a particular range. The range defined in this manner may or may not include end values, and may be combined arbitrarily, that is, any lower limit may be combined with any upper limit to form a range. For example, if ranges of 60-120 and 80-110 are listed for a particular parameter, it is understood that ranges of 60-110 and 80-120 are also anticipated. In addition, if the minimum range values listed are 1 and 2, and the maximum range values listed are 3, 4 and 5, all the following ranges can be anticipated: 1-3, 1-4, 1-5, 2-3, 2-4, and 2-5. In the present application, unless otherwise specified, a numerical range "a-b" represents an abbreviated representation of any combination of real numbers between a and b, where both a and b are real numbers. For example, a numerical range "0-5" means that all real numbers between "0-5" have been listed herein, and "0-5" is just an abbreviated representation of a combination of these numerical values. In addition, when a certain parameter is expressed as an integer ≥2, it is equivalent to disclosing that the parameter is, for example, an integer 2, 3, 4, 5, 6, 7, 8, 9, 10, 11, 12, or the like.

Unless otherwise specified, all embodiments and optional embodiments of the present application may be combined with each other to form a new technical solution.

Unless otherwise specified, all technical features and optional technical features of the present application may be combined with each other to form a new technical solution.

Unless otherwise specified, all steps of the present application may be performed sequentially or randomly, but preferably, performed sequentially. For example, a method includes steps (a) and (b), which means that the method may include steps (a) and (b) performed sequentially, or steps (b) and (a) performed sequentially. For example, the method mentioned may further include step (c), which means that step (c) may be added to the method in any order, for example, the method may include steps (a), (b) and (c), steps (a), (c) and (b), steps (c), (a) and (b), or the like.

Unless otherwise specified, words "comprising" and "containing" mentioned in the present application are open-ended or closed-ended. For example, the words "comprising" and "containing" may mean that other components that are not listed may further be comprised or contained, or only listed components may be comprised or contained.

In the present application, unless otherwise specified, the term "or" is inclusive. For example, the phrase "A or B" means "A, B or both A and B". More particularly, a condition "A or B" is satisfied by any one of the following: A is true (or present) and B is false (or not present); A is false (or not present) and B is true (or present); or both A and B are true (or present).

Lithium bis(fluorosulfonyl)imide (of which chemical formula is $Li[N(SO_2F)_2]$, English abbreviation is LiFSI) is an important new material containing fluorine. Due to its special molecular structure, there is a low binding energy between $Li^+$ and $FSI^-$, which is conducive to the dissociation of $Li^+$. Therefore, by adding LiFSI to an electrolytic solution, higher conductivity can be obtained; meanwhile, LiFSI also has characteristics of high thermal stability, wide electrochemical window, and low corrosion rate, especially in power battery, it can improve cycle performance and rate performance of the power battery, and is expected to become a new electrolyte lithium salt for lithium-ion batteries.

At present, reason why LiFSI cannot be used on a large scale is mainly due to high production cost resulted from the limitation of synthesis process conditions. In a synthesis process, there are shortcomings such as cumbersome process, long procedure, low product conversion rate, large energy consumption and environmental pollution. In addition, as an electrolyte for a lithium-ion secondary battery, LiFSI needs to meet demanding requirements such as high purity and anhydrous property, especially after the introduction of water, it is difficult to completely remove the water by heating-up and drying till decomposition, and even if the water is removed, a great loss in yield is required.

In order to overcome the defects of demanding process conditions, severe device corrosion, ineffective control of impurity ions, and high energy consumption in existing methods for preparing LiFSI, the present application provides a method for preparing LiFSI with advantages of simple operation, mild reaction conditions, and easy removal of impurity ions.

In one embodiment of the present application, the present application provides a method for preparing lithium bis (fluorosulfonyl)imide, including (1) adding an organic solvent and an absorbent A to a reaction kettle, then adding part of an ammonia source, and finally adding $SO_2X_2$ and a remaining ammonia source simultaneously for reaction, to obtain a solution of a salt $(SO_2F{-}NH{-}SO_2F)\cdot A$ containing bis(fluorosulfonyl)imide and the absorbent A, where in the $SO_2X_2$, X is independently fluorine or chlorine;

(2) performing filtration, concentration and washing on the solution obtained in step (1) to obtain a purified salt $(SO_2F{-}NH{-}SO_2F)\cdot A$ of the bis(fluorosulfonyl)imide and the absorbent A;

(3) adding a lithium source to the purified salt $(SO_2F{-}NH{-}SO_2F)\cdot A$ of the bis(fluorosulfonyl)imide and the absorbent A obtained in step (2) for reaction to obtain a solution containing lithium bis(fluorosulfonyl)imide; and (4) performing dehydration, concentration, crystallization with a non-aqueous poor solvent, and drying on the solution obtained in step (3) to obtain the lithium bis(fluorosulfonyl)imide.

Although the mechanism is not yet clear, the applicant unexpectedly find: when a salt $(SO_2F—NH—SO_2F)\cdot A$ of bis(fluorosulfonyl)imide and an absorbent A is prepared, part of an ammonia source is first added, and then $SO_2X_2$ and a remaining ammonia source are added simultaneously for reaction, which realizes the preparation of lithium bis (fluorosulfonyl)imide with high yield, and enables the prepared lithium bis(fluorosulfonyl)imide to have high purity and low chroma.

Optionally, the $SO_2X_2$ may be $SO_2F_2$, $SO_2Cl_2$, or $SO_2F_xCl_y$, where x+y=2, x>0, and y>0.

In step (1), the following reactions mainly take place:

main reaction (B is an ammonia source):

$$SO_2X_2+B+A \rightarrow (SO_2F—NH—SO_2F)\cdot A+A(HX)n\ (n=1\text{-}12);$$

side reaction 1:

$$SO_2X_2+B+A \rightarrow NH_2—SO_2—NH_2+A\cdot(HX)n\ (n=1\text{-}12);\ \text{and}$$

side reaction 2:

$$SO_2X_2+A \rightarrow [XSO_2\cdot A]+X^-+X^-[A\text{-}SO_2\text{-}A]^{2+}X^-.$$

A by-product generated in the side reaction 2 may be colored. In order to make the color of material lighter, that is, to reduce chroma, long-term contact between $SO_2X_2$ and the absorbent A should be avoided. Therefore, during feeding, part of an ammonia source is added first, and then $SO_2X_2$ and a remaining ammonia source are added simultaneously to directly start the main reaction.

In some embodiments, in step (1), a mass of the part of the ammonia source accounts for 3%-10% of a total mass of the ammonia source. When a ratio of the mass of the part of the ammonia source to the total mass of the ammonia source is within the given range, yield of lithium bis(fluorosulfonyl) imide can be further increased, purity can be improved, and chroma can be reduced.

In some embodiments, in step (1), a molar ratio of the $SO_2X_2$ to the ammonia source is (greater than 2 to less than or equal to 3):1, optionally (2.01-2.1):1. In step (1), if ammonia gas is excessive, the above side reaction 1 is likely to take place and a sulfonamide solid is generated, which not only affects yield, but also makes the material turbid, and causes subsequent filtration to be difficult. When the molar ratio of the $SO_2X_2$ to the ammonia source is within the given range, the yield of lithium bis(fluorosulfonyl)imide can be further increased.

In some embodiments, in step (1), a molar ratio of the absorbent A to the ammonia source is (1-5):1.

In some embodiments, in step (1), temperature of the reaction is −10° C. to 50° C., optionally 5° C. to 35° C.; and time of the reaction is 2 h to 8 h. When the temperature and time of the reaction in step (1) are controlled within the given range, the yield of lithium bis(fluorosulfonyl)imide can be further increased. When the reaction temperature is lower than −10° C., a reaction rate becomes slow; and when the reaction temperature is higher than 50° C., occurrence of side reactions will increase, thereby affecting the yield. In addition, if the temperature is too high, the solvent is easy to vaporize, which results in pressure in the reaction kettle is too high, and affects the safety of production.

In some embodiments, in step (1), the ammonia source is one or more of ammonia gas, fluorinated amine, sulfonamide, sulfamic acid and difluorinated amine.

In some embodiments, in step (1), the absorbent A is one or more of pyridine, picoline, N-methylpyrrolidone, imidazole, trimethylamine, triethylamine, tri-n-propylamine, tri-n-butylamine and diisopropylethylamine.

In some embodiments, in step (1), the organic solvent is one or more of acetonitrile, propionitrile, isopropionitrile, diethyl ether, propyl ether, isopropyl ether, tetrahydrofuran, acetone, butanone, methyl isobutyl ketone and methyl pyrrolidone.

In the embodiments of the present application, in step (1), there is no particular limitation on the pressure of the reaction, and the reaction can be carried out under normal pressure conditions, pressurized conditions or reduced pressure conditions.

In some embodiments, in step (2), the solution obtained in step (1) is filtered to remove a by-product sulfonamide generated by the side reaction 1. For example, the filtration is performed by using a tetrafluoro filter bag with a pore diameter of 5 μm to 20 μm, optionally 6 μm to 15 μm.

In some embodiments, in step (2), the filtered solution is concentrated to remove the organic solvent and the unreacted absorbent A. This concentration step is also called "falling film" in the chemical industry. The removed organic solvent and the unreacted absorbent A are respectively reused for the reaction in step (1) to reduce production cost. If the organic solvent and the unreacted absorbent A are not removed after step (1) but after step (3), lithium bis(fluorosulfonyl)imide will decompose during the process, thereby reducing product yield.

In some embodiments, the concentration includes reduced-pressure distillation, falling film evaporation or scraper evaporation.

In the embodiments of the present application, a vacuum degree of the reduced-pressure distillation is −0.05 MPa to −0.09 MPa.

In some embodiments, in step (2), the concentrated solution is washed with water to remove A·(HX)n and impurity ions (such as $F^-$, $SO4^{2-}$, $FSO^{3-}$, and $Cl^-$) generated in the reaction, where A and X are as defined above, and n is any value between 1-12. This washing step is also called extraction in the chemical industry. After removal treatment of A·(HX)n, the absorbent A can be reused for the reaction in step (1), thereby further reducing the production cost. If the washing step is not performed, A·(HX)n will react with the lithium source to generate a by-product in step (3), thereby consuming too much lithium source and affecting the production cost.

In some embodiments, a mass ratio of the water used for washing to the concentrated solution is 1:(1-2), optionally 1:(1.1-1.5).

In some embodiments, the water used for washing is deionized water.

In some embodiments, in step (3), the lithium source is one or more of lithium hydroxide, lithium carbonate, lithium nitride, lithium oxide and lithium hydride.

In some embodiments, the lithium hydroxide includes a solvate, such as a hydrate.

In step (3), the following reaction mainly takes place (M is a lithium source):

$$(SO_2F—NH—SO_2F)\cdot A+M \rightarrow (SO_2F—NH—SO_2F)^-Li^+(LiFSI)+A.$$

In some embodiments, in step (3), temperature of the reaction is 15° C. to 40° C.; and time of the reaction is 0.5 h to 6 h.

In some embodiments, the lithium source is used in a solid form.

In some embodiments, the lithium source is used in the form of an aqueous solution, and a concentration of the aqueous solution is 5 wt % to 15 wt %.

In some embodiments, in step (4), the solution obtained in step (3) is dehydrated with an ester solvent, so that a water content of a product is ≤50 ppm, optionally ≤20 ppm. The ester solvent is for example diethyl carbonate (DEC), ethyl methyl carbonate (EMC) or dimethyl carbonate (DMC). The dehydration step includes adding the ester solvent to the solution obtained in step (3), and then evaporating the ester solvent at −0.05 MPa to −0.09 MPa while replenishing the ester solvent.

Since lithium bis(fluorosulfonyl)imide has very strong hygroscopicity, it is difficult to reduce the water content to a target requirement by an ordinary evaporation process. An ester solvent can weaken the adsorption of a lithium salt to water, and therefore in the present application, replenishing an ester solvent while evaporating the ester solvent can reduce the water content to the target requirement.

In some embodiments, in step (4), a total mass of the ester solvent used for dehydration accounts for 50%-70% of a mass of the solution obtained in step (3), optionally 55%-65%.

In some embodiments, in step (4), the solution obtained after dehydration is concentrated to evaporate the ester solvent used in the dehydration step to 20%-40% (a mass ratio), so as to ensure the normal operation of the subsequent crystallization process.

In the embodiments of the present application, in step (4), the concentration is reduced-pressure distillation, falling film evaporation or scraper evaporation. Optionally, the reduced-pressure distillation is carried out at a vacuum degree of −0.05 MPa to −0.09 MPa.

In some embodiments, in step (4), before and/or after dehydration and evaporation of the ester solvent, a by-product lithium compound (such as $NH_2SO_3Li$, $Li_2SO_4$, and 2LiF) is removed by centrifugation and filtration, such as by a scraper centrifuge or a disc centrifuge.

In some embodiments, in step (4), the concentrated solution is crystallized with a non-aqueous poor solvent.

In some embodiments, in step (4), the poor solvent is one or more of $C_1$-$C_8$ alkanes, benzene, toluene, xylene, dichloromethane, dichloroethane, trichloroethane, tetrachloroethane and carbon tetrachloride.

In some embodiments, in step (4), crystals obtained after crystallization are filtered. The filtration is performed with a 100-300 mesh filter plate.

In some embodiments, in step (4), the filtered crystals are dried. Optionally, the drying is vacuum drying.

In some embodiments, purity of the crystals obtained after drying is ≥98.8%, optionally ≥99.0%, further optionally ≥99.4%, Cl— is ≥3 ppm, HF is ≥50 ppm, optionally 25 ppm, and chroma is ≥50 Hazen, optionally ≥25 Hazen.

In one embodiment of the present application, provided is lithium bis(fluorosulfonyl)imide prepared by the method as described above.

In one embodiment of the present application, provided is an electrolytic solution containing lithium bis(fluorosulfonyl)imide, where the lithium bis(fluorosulfonyl)imide is the lithium bis(fluorosulfonyl)imide as described above or the lithium bis(fluorosulfonyl)imide prepared by the method as described above.

In one embodiment of the present application, provided is a secondary battery including the electrolytic solution as described above.

In the present application, the above method for preparing lithium bis(fluorosulfonyl)imide has advantages of simple operation, mild reaction conditions, easy removal of impurity ions, and high yield. The lithium bis(fluorosulfonyl) imide prepared by the above method has high purity and low chroma, and has better performance in an electrolytic solution in the later stage.

EXAMPLES

Examples of the present application will be described hereinafter. The examples described below are exemplary and merely used to explain the present application, and may not be understood as limitation to the present application. Where specific techniques or conditions are not specified in the examples, they are performed according to techniques or conditions described in the literature in the art or according to product specifications. Reagents or instruments used without specifying the manufacturer are all commercially available conventional products.

Example 1

(1) First 310 g of triethylamine (3 μmol) as an absorbent A and 300 g of acetonitrile as an organic solvent were added to a reactor, and stirring was started with a stirring rate of 1500 rpm, and temperature was reduced to 15° C., then 1 g of ammonia gas (0.06 μmol) was slowly introduced, and finally 16 g of ammonia gas (0.94 μmol) and 209 g of sulfuryl fluoride (2.05 mol) were introduced simultaneously for heat preservation for 4 h to obtain a solution containing a bis(fluorosulfonyl)imide triethylamine salt.

(2) The solution obtained in step (1) was filtered using a tetrafluoro filter bag with a pore diameter of 5 μm, a filtrate was subjected to reduced-pressure distillation at −0.07 MPa to remove the organic solvent and the unreacted absorbent, and deionized water was used for washing to remove impurities such as a fluoride ion and a triethylamine hydrogen fluoride salt to obtain a purified bis(fluorosulfonyl)imide triethylamine salt.

(3) 42 g of lithium hydroxide monohydrate (LiOH $H_2O$) was added to the purified bis(fluorosulfonyl)imide triethylamine salt obtained in step (2) for stirring at room temperature for 2 hours to obtain a solution containing lithium bis(fluorosulfonyl)imide.

(4) A centrifuge was used to settle and separate solid residues from the solution obtained in step (3), diethyl carbonate was added to the filtrate, and the diethyl carbonate was evaporated at −0.07 MPa for dehydration while diethyl carbonate was replenished, where a total mass of the diethyl carbonate added accounts for 60% of a mass of the solution obtained in step (3), and a dehydrated solution was subjected to reduced-pressure distillation at −0.09 MPa, so that the mass of the diethyl carbonate accounts for 30% of the mass of the solution obtained in step (3), so as to ensure the normal progress of the subsequent crystallization process. A centrifuge was used to settle and separate solid residues, 200 g of dichloromethane was added for crystallization, a filter plate with a filter pore diameter of 250 meshes was used for filtration, and crystals were then washed with 100 g of dichloromethane, and dried in vacuum to obtain 172.1 g of lithium bis(fluorosulfonyl)

imide with a yield of 92%, a purity of 99.8%, HF of 15 ppm, and chroma of 10 Hazen.

Example 2

Preparation of lithium bis(fluorosulfonyl)imide refers to Example 1 as a whole, and differs in that in step (1), 0.5 g of ammonia gas (0.03 μmol) was first introduced slowly, and then 16.5 g of ammonia gas (0.97 μmol) and 209 g of sulfuryl fluoride (2.05 μmol) were simultaneously introduced; and in step (4), 166.5 g of lithium bis(fluorosulfonyl)imide was obtained with a yield of 89%, a purity of 99.5%, HF of 20 ppm, and chroma of 15 Hazen.

Example 3

Preparation of lithium bis(fluorosulfonyl)imide refers to Example 1 as a whole, and differs in that in step (1), 1.7 g of ammonia gas (0.1 μmol) was first introduced slowly, and then 15.3 g of ammonia gas (0.9 μmol) and 209 g of sulfuryl fluoride (2.05 μmol) were simultaneously introduced; and in step (4), 168.4 g of lithium bis(fluorosulfonyl)imide was obtained with a yield of 90%, a purity of 99.6%, HF of 18 ppm, and chroma of 15 Hazen.

Example 4

Preparation of lithium bis(fluorosulfonyl)imide refers to Example 1 as a whole, and differs in that in step (1), 0.3 g of ammonia gas (0.02 μmol) was first introduced slowly, and then 16.7 g of ammonia gas (0.98 μmol) and 209 g of sulfuryl fluoride (2.05 μmol) were simultaneously introduced; and in step (4), 149.7 g of lithium bis(fluorosulfonyl)imide was obtained with a yield of 80%, a purity of 98.7%, HF of 30 ppm, and chroma of 35 Hazen.

Example 5

Preparation of lithium bis(fluorosulfonyl)imide refers to Example 1 as a whole, and differs in that in step (1), 3.4 g of ammonia gas (0.2 μmol) was first introduced slowly, and then 13.6 g of ammonia gas (0.8 μmol) and 209 g of sulfuryl fluoride (2.05 μmol) were simultaneously introduced; and in step (4), 151.5 g of lithium bis(fluorosulfonyl)imide was obtained with a yield of 81%, a purity of 98.9%, HF of 28 ppm, and chroma of 35 Hazen.

Example 6

Preparation of lithium bis(fluorosulfonyl)imide refers to Example 1 as a whole, and differs in that in step (1), 1 g of ammonia gas (0.06 μmol) was first introduced slowly, and then 16 g of ammonia gas (0.94 μmol) and 205 g of sulfuryl fluoride (2.01 μmol) were simultaneously introduced; and in step (4), 164.6 g of lithium bis(fluorosulfonyl)imide was obtained with a yield of 88%, a purity of 99.4%, HF of 20 ppm, and chroma of 20 Hazen.

Example 7

Preparation of lithium bis(fluorosulfonyl)imide refers to Example 1 as a whole, and differs in that in step (1), 1 g of ammonia gas (0.06 μmol) was first introduced slowly, and then 16 g of ammonia gas (0.94 μmol) and 214 g of sulfuryl fluoride (2.1 μmol) were simultaneously introduced; and in step (4), 166.5 g of lithium bis(fluorosulfonyl)imide was obtained with a yield of 89%, a purity of 99.5%, HF of 18 ppm, and chroma of 20 Hazen.

Example 8

Preparation of lithium bis(fluorosulfonyl)imide refers to Example 1 as a whole, and differs in that in step (1), 1 g of ammonia gas (0.06 μmol) was first introduced slowly, and then 16 g of ammonia gas (0.94 μmol) and 204 g of sulfuryl fluoride (2 μmol) were simultaneously introduced; and in step (4), 153.4 g of lithium bis(fluorosulfonyl)imide was obtained with a yield of 82%, a purity of 98.7%, HF of 25 ppm, and chroma of 35 Hazen.

Example 9

Preparation of lithium bis(fluorosulfonyl)imide refers to Example 1 as a whole, and differs in that in step (1), 1 g of ammonia gas (0.06 μmol) was first introduced slowly, and then 16 g of ammonia gas (0.94 μmol) and 225 g of sulfuryl fluoride (2.2 μmol) were simultaneously introduced; and in step (4), 149.7 g of lithium bis(fluorosulfonyl)imide was obtained with a yield of 80%, a purity of 98.7%, HF of 28 ppm, and chroma of 35 Hazen.

Example 10

Preparation of lithium bis(fluorosulfonyl)imide refers to Example 1 as a whole, and differs in that in step (1), 101 g of triethylamine (1 μmol) was added as an absorbent A; and in step (4), 164.6 g of lithium bis(fluorosulfonyl)imide was obtained with a yield of 88%, a purity of 99.5%, HF of 17 ppm, and chroma of 15 Hazen.

Example 11

Preparation of lithium bis(fluorosulfonyl)imide refers to Example 1 as a whole, and differs in that in step (1), 506 g of triethylamine (5 μmol) was added as an absorbent A; and in step (4), 166.5 g of lithium bis(fluorosulfonyl)imide was obtained with a yield of 89%, a purity of 99.6%, HF of 15 ppm, and chroma of 15 Hazen.

Example 12

Preparation of lithium bis(fluorosulfonyl)imide refers to Example 1 as a whole, and differs in that in step (1), 51 g of triethylamine (0.5 μmol) was added as an absorbent A; and in step (4), 140.3 g of lithium bis(fluorosulfonyl)imide was obtained with a yield of 75%, a purity of 95.9%, HF of 35 ppm, and chroma of 45 Hazen.

Example 13

Preparation of lithium bis(fluorosulfonyl)imide refers to Example 1 as a whole, and differs in that in step (1), 607 g of triethylamine (6 μmol) was added as an absorbent A; and in step (4), 149.7 g of lithium bis(fluorosulfonyl)imide was obtained with a yield of 80%, a purity of 96.7%, HF of 30 ppm, and chroma of 40 Hazen.

Example 14

Preparation of lithium bis(fluorosulfonyl)imide refers to Example 1 as a whole, and differs in that in step (1), first 310 g of triethylamine (3 μmol) as an absorbent A and 300 g of acetonitrile as an organic solvent were added to a reactor, and stirring was started with a stirring rate of 1500 rpm, and temperature was reduced to 14° C., then 2.2 g of ammonium fluoride (0.06 μmol) was added, and finally 34.8 g of ammonium fluoride (0.94 μmol) was added while 209 g of sulfuryl fluoride (2.05 μmol) was introduced simultaneously for heat preservation for 4 h to obtain a solution containing a bis(fluorosulfonyl)imide triethylamine salt; and in step (4), 164.6 g of lithium bis(fluorosulfonyl)imide was obtained with a yield of 88%, a purity of 99.5%, HF of 18 ppm, and chroma of 15 Hazen.

Example 15

Preparation of lithium bis(fluorosulfonyl)imide refers to Example 1 as a whole, and differs in that in step (1), first 310 g of triethylamine (3 μmol) as an absorbent A and 300 g of acetonitrile as an organic solvent were added to a reactor, and stirring was started with a stirring rate of 1500 rpm, and temperature was reduced to 15° C., then 5.8 g of ammonium fluoride (0.06 μmol) is added, and finally 90.2 g of ammonium fluoride (0.94 μmol) was added while 209 g of sulfuryl fluoride (2.05 μmol) was introduced simultaneously for heat preservation for 4 h to obtain a solution containing a bis(fluorosulfonyl)imide triethylamine salt; and in step (4), 162.8 g of lithium bis(fluorosulfonyl)imide was obtained with a yield of 87%, a purity of 99.2%, HF of 20 ppm, and chroma of 20 Hazen.

Example 16

Preparation of lithium bis(fluorosulfonyl)imide refers to Example 1 as a whole, and differs in that in step (1), first 310 g of triethylamine (3 μmol) as an absorbent A and 300 g of acetonitrile as an organic solvent were added to a reactor, and stirring was started with a stirring rate of 1500 rpm, and temperature was reduced to 15° C., then 1 g of ammonia gas (0.06 μmol) was slowly introduced, and finally 16 g of ammonia gas (0.94 μmol) was added while 243 g of fluorochlorosulfonyl (2.05 μmol) was introduced simultaneously for heat preservation for 4 h to obtain a solution containing a bis(fluorosulfonyl)imide triethylamine salt; and in step (4), 166.5 g of lithium bis(fluorosulfonyl)imide was obtained with a yield of 89%, a purity of 99.5%, HF of 18 ppm, and chroma of 15 Hazen.

Example 17

Preparation of lithium bis(fluorosulfonyl)imide refers to Example 1 as a whole, and differs in that in step (1), 237 g of pyridine (3 μmol) was added as an absorbent A; and in step (4), 168.4 g of lithium bis(fluorosulfonyl)imide was obtained with a yield of 90%, a purity of 99.6%, HF of 16 ppm, and chroma of 15 Hazen.

Example 18

Preparation of lithium bis(fluorosulfonyl)imide refers to Example 1 as a whole, and differs in that in step (1), 300 g of diethyl ether was added as an organic solvent; and in step (4), 164.6 g of lithium bis(fluorosulfonyl)imide was obtained with a yield of 88%, a purity of 99.4%, HF of 19 ppm, and chroma of 20 Hazen.

Example 19

Preparation of lithium bis(fluorosulfonyl)imide refers to Example 1 as a whole, and differs in that in step (3), 36.9 g of lithium carbonate was added to the purified bis(fluorosulfonyl)imide triethylamine salt obtained in step (2) for stirring at room temperature for 2 h to obtain a solution containing lithium bis(fluorosulfonyl)imide; and in step (4), 160.9 g of lithium bis(fluorosulfonyl)imide was obtained with a yield of 86%, a purity of 99.0%, HF of 22 ppm, and chroma of 25 Hazen.

Example 20

Preparation of lithium bis(fluorosulfonyl)imide refers to Example 1 as a whole, and differs in that in step (4), 400 g of carbon tetrachloride was used for crystallization, and 160.9 g of lithium bis(fluorosulfonyl)imide was obtained with a yield of 86%, a purity of 98.8%, HF of 25 ppm, and chroma of 25 Hazen.

Comparative Example 1

Preparation of lithium bis(fluorosulfonyl)imide refers to Example 1 as a whole, and differs in that in step (1), first 310 g of triethylamine (3 μmol) as an absorbent A and 300 g of acetonitrile as an organic solvent were added to a reactor, and stirring was started with a stirring rate of 1500 rpm, and temperature was reduced to 15° C., then 17 g of ammonia gas (1 μmol) was slowly introduced, and finally 209 g of sulfuryl fluoride (2.05 μmol) were introduced for heat preservation for 4 h to obtain a solution containing a bis (fluorosulfonyl)imide triethylamine salt; and in step (4), 127.2 g of lithium bis(fluorosulfonyl)imide was obtained with a yield of 68%, a purity of 88.7%, HF of 50 ppm, and chroma of 50 Hazen.

Comparative Example 2

Preparation of lithium bis(fluorosulfonyl)imide refers to Example 1 as a whole, and differs in that in step (1), first 310 g of triethylamine (3 μmol) as an absorbent A and 300 g of acetonitrile as an organic solvent were added to a reactor, and stirring was started with a stirring rate of 1500 rpm, and temperature was reduced to 15° C., then 209 g of sulfuryl fluoride (2.05 μmol) was introduced, and finally 17 g of ammonia gas (1 μmol) was slowly introduced for heat preservation for 4 h to obtain a solution containing a bis(fluorosulfonyl)imide triethylamine salt; and in step (4), 97.3 g of lithium bis(fluorosulfonyl)imide was obtained with a yield of 52%, a purity of 81.9%, HF of 65 ppm, and chroma of 300 Hazen.

Test Method

1. Test Method for Purity of a Product Lithium Bis(Fluorosulfonyl)Imide

Quantitative analysis by ion chromatography (IC) is used for determination.

$$w=[(c\times V\times 187)/(m\times 180.06)]\times 10^{-6}\times 100\%$$

w: purity of lithium bis(fluorosulfonyl)imide, with the unit of percentage (%)

c: concentration of bis(fluorosulfonyl)imide ion obtained through calculation of an ion chromatogram curve, with the unit of milligram/liter (mg/L)

V: sample pretreatment constant volume, with the unit of milliliter (mL)

m: mass of a weighed sample, with the unit of gram (g)

187: molar mass of lithium bis(fluorosulfonyl)imide, with the unit of gram/mole g/moL 180.06: molar mass of bis(fluorosulfonyl)imide, with the unit of gram/mole g/moL 2. Test Method for HF in a Product Lithium Bis(Fluorosulfonyl)Imide A free HF content can be titrated with a sodium hydroxide standard solution in an ice-water mixture environment.

$$HF\ (\mu g/g)=(V-V0)\times 0.01\times 20\times 10^{6}/1000m=(V-V0)\times 200/m$$

In the formula:

0.01: concentration of a NaOH standard solution, mol/L

V0: volume reading of a burette when titrating a blank background (100 ml pure water+50 g ice cube) to an end point, ml V: volume reading of a burette after adding a sample and performing titration to an end point, ml 20: molar molecular weight of HF, g/mol m: mass of a weighed sample, g $10^6$: coefficient for conversion into g/g 3. Test Method for Chroma of a Product Lithium Bis(Fluorosulfonyl)Imide A series of standard solutions from 10, 20, 30, to 200 Hazen are prepared from 500 Hazen units of platinum-cobalt standard solution.

$$V=100N/500=N/5 \qquad \text{Calculation formula}$$

V: volume of 500 Hazen standard solution required (ml)

N: color standard Hazen to be prepared, with a preparation volume of 100 ml

A series of Pt—Co standard chroma solutions packed in a 50 ml colorimetric tube are placed on a colorimetric frame according to the size of chroma.

A white background was placed in a light box, 25 ml of sample is packed in a 50 ml colorimetric tube and placed in the middle of a bottom plate of the light box, and the platinum-cobalt standard solutions are compared visually along an axis of the colorimetric tube in the standard light box. The color of the sample should not be darker than that of the platinum-cobalt standard solutions.

Results of Examples 1-20 and Comparative Examples 1-2 are summarized in Table 1-Table 4.

TABLE 1

Effect of ammonia source on yield and product

| Examples | Reaction conditions: Proportion of part of ammonia source | Reaction conditions: Molar ratio of $SO_2X_2$ to ammonia source | Reaction conditions: Molar ratio of A to ammonia source | Product parameters: Yield % | Product parameters: Purity % | Product parameters: HF ppm | Product parameters: Chroma Hazen |
|---|---|---|---|---|---|---|---|
| Example 1 | 6% | 2.05:1 | 3:1 | 92 | 99.8 | 15 | 10 |
| Example 2 | 3% | 2.05:1 | 3:1 | 89 | 99.5 | 20 | 15 |
| Example 3 | 10% | 2.05:1 | 3:1 | 90 | 99.6 | 18 | 15 |
| Example 4 | 2% | 2.05:1 | 3:1 | 80 | 98.7 | 30 | 35 |
| Example 5 | 20% | 2.05:1 | 3:1 | 81 | 98.9 | 28 | 35 |
| Comparative Example 1 | 100% | 2.05:1 | 3:1 | 68 | 88.7 | 50 | 50 |
| Comparative Example 2 | / | 2.05:1 | 3:1 | 52 | 81.9 | 65 | 300 |

TABLE 2

Effect of molar ratio of $SO_2X_2$ to ammonia source on yield and product

| Examples | Reaction conditions: Proportion of part of ammonia source | Reaction conditions: Molar ratio of $SO_2X_2$ to ammonia source | Reaction conditions: Molar ratio of A to ammonia source | Product parameters: Yield % | Product parameters: Purity % | Product parameters: HF ppm | Product parameters: Chroma Hazen |
|---|---|---|---|---|---|---|---|
| Example 1 | 6% | 2.05:1 | 3:1 | 92 | 99.8 | 15 | 10 |
| Example 6 | 6% | 2.01:1 | 3:1 | 88 | 99.4 | 20 | 20 |
| Example 7 | 6% | 2.1:1 | 3:1 | 89 | 99.5 | 18 | 20 |
| Example 8 | 6% | 2.0:1 | 3:1 | 82 | 98.7 | 25 | 35 |
| Example 9 | 6% | 2.2:1 | 3:1 | 80 | 98.4 | 28 | 35 |

TABLE 3

Effect of molar ratio of absorbent A to ammonia source on yield and product

| Examples | Reaction conditions: Proportion of part of ammonia source | Molar ratio of $SO_2X_2$ to ammonia source | Molar ratio of A to ammonia source | Product parameters: Yield % | Purity % | HF ppm | Chroma Hazen |
|---|---|---|---|---|---|---|---|
| Example 1 | 6% | 2.05:1 | 3:1 | 92 | 99.8 | 15 | 10 |
| Example 10 | 6% | 2.05:1 | 1:1 | 88 | 99.5 | 17 | 15 |
| Example 11 | 6% | 2.05:1 | 5:1 | 89 | 99.6 | 15 | 15 |
| Example 12 | 6% | 2.05:1 | 0.5:1 | 75 | 95.9 | 35 | 45 |
| Example 13 | 6% | 2.05:1 | 6:1 | 80 | 96.7 | 30 | 40 |

TABLE 4

Effect of other parameters on yield and product

| Examples | Reaction conditions: Ammonia source | $SO_2X_2$ | Absorbent | Organic solvent | Lithium salt | Poor solvent | Product: Yield % | Purity % | HF ppm | Chroma Hazen |
|---|---|---|---|---|---|---|---|---|---|---|
| Example 1 | Ammonia gas | Sulfuryl fluoride | Triethylamine | Acetonitrile | $LiOH•H_2O$ | Dichloromethane | 92 | 99.8 | 15 | 10 |
| Example 14 | Ammonium fluoride | Sulfuryl fluoride | Triethylamine | Acetonitrile | $LiOH•H_2O$ | Dichloromethane | 88 | 99.5 | 18 | 15 |
| Example 15 | Sulfonyl ammonium | Sulfuryl fluoride | Triethylamine | Acetonitrile | $LiOH•H_2O$ | Dichloromethane | 87 | 99.2 | 20 | 20 |
| Example 16 | Ammonia gas | Fluorochloro sulfonyl | Triethylamine | Acetonitrile | $LiOH•H_2O$ | Dichloromethane | 89 | 99.5 | 18 | 15 |
| Example 17 | Ammonia gas | Sulfuryl fluoride | Pyridine | Acetonitrile | $LiOH•H_2O$ | Dichloromethane | 90 | 99.6 | 16 | 15 |
| Example 18 | Ammonia gas | Sulfuryl fluoride | Triethylamine | Diethyl ether | $LiOH•H_2O$ | Dichloromethane | 88 | 99.4 | 19 | 20 |
| Example 19 | Ammonia gas | Sulfuryl fluoride | Triethylamine | Acetonitrile | Lithium carbonate | Dichloromethane | 86 | 99.0 | 22 | 25 |
| Example 20 | Ammonia gas | Sulfuryl fluoride | Triethylamine | Acetonitrile | $LiOH•H_2O$ | Carbon tetrachloride | 86 | 98.8 | 25 | 25 |

As can be seen from Table 1 to Table 4, yield and product purity of all the above Examples are higher than those of Comparative Examples, while HF and chroma of the product are lower than those of Comparative Examples.

As can be seen from Table 1, when a salt of bis(fluorosulfonyl)imide and an absorbent A was prepared, part of ammonia source was first added, and then SO2X2 and a remaining ammonia source were simultaneously added for reaction, which can significantly improve yield of a method for preparing lithium bis(fluorosulfonyl)imide and purity of a product, while reducing HF and chroma of the product. When a mass of the part of the ammonia source accounts for 3%-10% of a total mass of the ammonia source, yield and product purity can be further improved, and product chroma can be reduced.

As can be seen from Table 2, when a molar ratio of the $SO_2X_2$ to the ammonia source is (greater than 2 to less than or equal to 3):1, yield and product purity are both higher. When the molar ratio of the $SO_2X_2$ to the ammonia source is (2.01-2.1):1, yield and product purity can be further improved, while product chroma and HF can be reduced.

As can be seen from Table 3, when a molar ratio of the absorbent A to the ammonia source is (1-5):1, yield and product purity can be further improved, while product chroma and HF can be reduced.

As can be seen from Table 4, the method has good compatibility with different ammonia sources, $SO_2X_2$, absorbents, organic solvents, lithium salts and poor solvents.

It should be noted that the present application is not limited to the foregoing embodiments. The foregoing embodiments are merely examples, and embodiments having substantially the same constitution as the technical idea and exerting the same effects within the technical solution of the present application are all included within the technical scope of the present application. In addition, various modifications made to the embodiments that are easily thought of by persons skilled in the art without departing from the spirit of the present application, and other embodiments that are constructed by combining some of the constituent elements of the embodiments are also included in the scope of the present application.

What is claimed is:

1. A method for preparing lithium bis(fluorosulfonyl) imide, comprising (1) adding an organic solvent and an absorbent A to a reaction kettle, then adding part of an ammonia source, and finally adding $SO_2X_2$ and a remaining ammonia source simultaneously for reaction, to obtain a solution of a salt ($SO_2F$—NH—$SO_2F$)·A containing bis(fluorosulfonyl)imide and the absorbent A, wherein in the $SO_2X_2$, X is independently fluorine or chlorine;

(2) performing filtration, concentration and washing on the solution obtained in step (1) to obtain a purified salt ($SO_2F$—NH—$SO_2F$)·A of the bis(fluorosulfonyl)imide and the absorbent A;

(3) adding a lithium source to the purified salt ($SO_2F$—NH—$SO_2F$)·A of the bis(fluorosulfonyl)imide and the absorbent A obtained in step (2) for reaction to obtain a solution containing lithium bis(fluorosulfonyl)imide; and (4) performing dehydration, concentration, crystallization with a non-aqueous poor solvent, and drying on the solution obtained in step (3) to obtain the lithium bis(fluorosulfonyl)imide, wherein in step (1), a mass of the part of the ammonia source accounts for 3%-10% of a total mass of the ammonia source.

2. The method according to claim 1, wherein in step (1), a molar ratio of the $SO_2X_2$ to the ammonia source is (greater than 2 to less than or equal to 3):1, optionally (2.01-2.1):1.

3. The method according to claim 1, wherein in step (1), a molar ratio of the absorbent A to the ammonia source is (1-5):1.

4. The method according to claim 1, wherein in step (1), the ammonia source is one or more of ammonia gas, fluorinated amine, sulfonamide, sulfamic acid and difluorinated amine.

5. The method according to claim 1, wherein in step (1), the absorbent A is one or more of pyridine, picoline, N-methylpyrrolidone, imidazole, trimethylamine, triethylamine, tri-n-propylamine, tri-n-butylamine and diisopropylethylamine.

6. The method according to claim 1, wherein in step (1), the organic solvent is one or more of acetonitrile, propionitrile, isopropionitrile, diethyl ether, propyl ether, isopropyl ether, tetrahydrofuran, acetone, butanone, methyl isobutyl ketone and methyl pyrrolidone.

7. The method according to claim 1, wherein in step (3), the lithium source is one or more of lithium hydroxide, lithium carbonate, lithium nitride, lithium oxide and lithium hydride.

8. The method according to claim 1, wherein in step (3), temperature of the reaction is 15° C. to 40° C.; and in step (3), time of the reaction is 0.5 h to 6 h.

9. The method according to claim 1, wherein in step (2) and step (4), the concentration comprises reduced-pressure distillation, falling film evaporation or scraper evaporation.

10. The method according to claim 1, wherein in step (4), the poor solvent is one or more of $C_1$-$C_8$ alkanes, benzene, toluene, xylene, dichloromethane, dichloroethane, trichloroethane, tetrachloroethane and carbon tetrachloride.

11. The method according to claim 1, wherein in step (1), temperature of the reaction is −10° C. to 50° C.; and in step (1), time of the reaction is 2 h to 8 h.

12. The method according to claim 5, wherein the temperature of the reaction is −5° C. to 35° C.

* * * * *